United States Patent [19]

Ballentine

[11] 4,112,912
[45] Sep. 12, 1978

[54] GAS BROILER

[76] Inventor: Earle W. Ballentine, 3641 Via Palomina St., Palos Verdes Estates, Calif. 90274

[21] Appl. No.: 826,463

[22] Filed: Aug. 22, 1977

Related U.S. Application Data

[63] Continuation-in-part of Ser. No. 696,791, Jun. 16, 1976, abandoned, which is a continuation-in-part of Ser. No. 610,563, Sep. 5, 1975, abandoned, which is a continuation-in-part of Ser. No. 582,737, Jun. 2, 1975, abandoned.

[51] Int. Cl.² .................................................. A47J 37/00
[52] U.S. Cl. ........................................ 126/41 R; 99/401
[58] Field of Search ...................... 126/39 R, 39 J, 41, 126/275; 99/389, 401

[56] References Cited

U.S. PATENT DOCUMENTS

| 3,322,112 | 5/1967 | Huff et al. | 126/41 R |
| 3,832,990 | 9/1974 | Trosch | 126/41 R |
| 3,870,031 | 3/1975 | Kruper | 126/41 R |

*Primary Examiner*—Edward G. Favors
*Attorney, Agent, or Firm*—Smyth, Pavitt, Siegemund, Jones & Martella

[57] ABSTRACT

An oven broiler is provided with an elongated stoichiometric burner having two rows of apertures from which emerge free turbulent gas jets entraining the stoichiometric quantity of combustion air before merging on account of the spacing between the apertures being proportional to the aperture diameter, the ratio of the Rankin temperature of gas and air; a curvilinear radiator shield is heated by the combustion products and directs radiation away from the burner, and a second shield is heated by the combustion products flowing off the first shield.

14 Claims, 3 Drawing Figures

U.S. Patent     Sept. 12, 1978     4,112,912
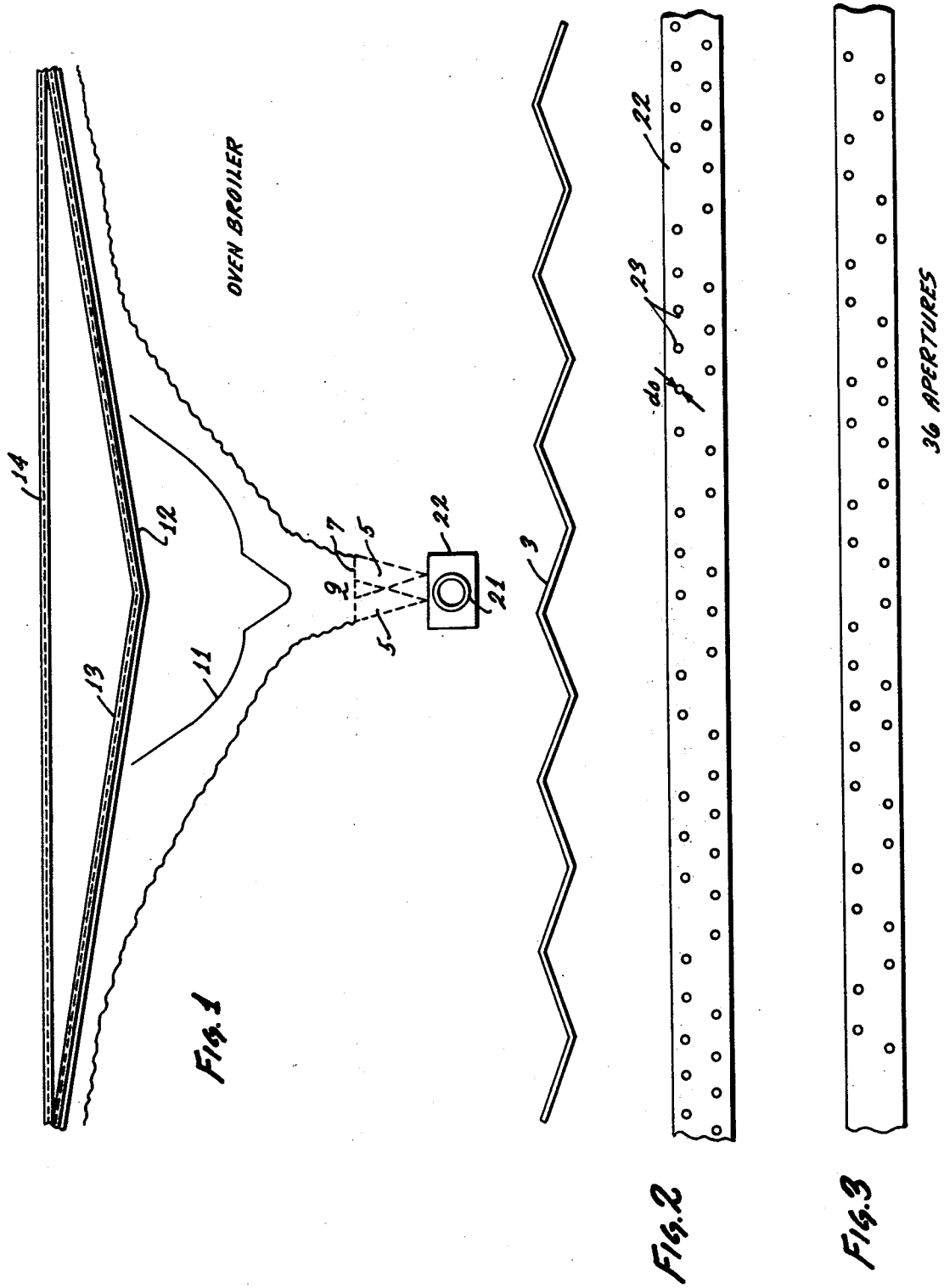

GAS BROILER

This is a continuation-in-part of my application Ser. No. 696-791, filed June 16, 1976, abandoned, which in turn is a continuation-in-part of my application Ser. No. 610-563, filed Sept. 5, 1975, abandoned, which in turn is a continuation-in-part of my application Ser. No. 582-737, filed June 2, 1975, now abandoned.

BACKGROUND OF THE INVENTION

My co-pending patent application Ser. No. 796,424 describes my stoichiometric burners and presents an expression for the stoichiometric aperture spacing. The stoichiometric spacing equation is exact, provided that the temperatures of the air and gaseous fuels are identical. This however is not the case in oven broilers.

The sole purpose of this application is to develop an equation for the stoichiometric aperture spacing of burners which will operate in a gas broiler whenever the air and gaseous fuel temperatures differ.

The stoichiometric air-to-fuel gas ratio is the most fundamental parameter in determining the stoichiometric aperture spacing. Under the assumption that the temperatures of fuel gas and air are equal, I found that a stoichiometric burner should be constructed to have a gas fed burner chamber with a flat top having a two dimensional array of apertures of diameter $d_0$ wherein the linear spacing between these apertures should be given by the equation $D_s = 2.42 R d_0$, wherein R is the air-to-gas ratio, representing the relative amount of air entrained by the free turbulent gas jets emerging from these apertures before the jets merge at some distance from the burner plane. For a specific distance $D_s$, the jets merge when the amount of air that has been entrained is such that R is the stoichiometric air-to-gas ratio as needed for complete combustion. I found that if the spacing is smaller by just a few percentages as compared with the desired value for true stoichiometry, the combustion becomes drastically incomplete. I further found that a spacing $D_s$ being about 15 percent or more larger than the stoichiometric spacing, the air-gas mixture is too diluted for maintaining a temperature sufficient for combustion. Thus, the spacing of the aperture should be as close as feasible to the stoichiometric spacing, permitting roughly a tolerance range from about $-1$ percent to less than $+15$ percent.

The stoichiometric ratio is a volumetric ratio. However, the densities of air and gaseous fuels are temperature dependent. The densities of these gases are inversely related to their absolute temperatures. In other words, the product of the densities and Rankine temperatures of the same gas is equal to a constant. The density of air at 70° F which is 530° F on the absolute scale, is 0.075 lbs/ft$^3$. Thus, the arbitrary constant becomes $0.075 \times 530 = 39.75$.

The density of a specific natural gas is 0.0465 lbs/ft$^3$ at 530° Rankine. Thus, the arbitrary constant for the gaseous fuel is $0.465 \times 530° = 24.65$. Thus, the densities of air and gaseous fuels can be expressed by the following equation, namely:

$$\lambda_A = 39.75\, T_R \text{ and } \lambda_G = 24.65\, T_R$$

where $\lambda_A$ and $\lambda_G$ are the densities of air and gaseous fuels in units of lbs/ft$^3$ and $T_R$ is the absolute Rankine temperature.

DESCRIPTION OF THE INVENTION

In accordance with the present invention, I found therefore that in order to maintain stoichiometric conditions, I must modify the spacing of the apertures in a two dimensional but elongated array of apertures in a gas fed burner chamber of a broiler, because the burner chamber in a broiler operates in a strong radiation field which heats the burner surfaces therein and also heats the surfaces in the broiler compartment and, therefore, the gas, while the air temperature remains low. I found that the stoichiometric spacing of the apertures of a two dimensional array of apertures in the burner top is given by the equation $$D_s = 2.42 \times R\, d_o \times T_{RG}/T_{RA}$$

where R is the air-gas ratio, $d_o$ is the aperture diameter, and $T_{RG}/T_{RA}$ is the Rankine temperature ratio of the gaseous fuel to the combustion air temperatures. The permissible deviations from the true stoichiometric spacing as given by this equation should also not exceed a few percents on the down side, preferably not more than on the up side, the deviation should be less than about $+15\%$.

In order to control the temperature of the gas, I found that the radiation field requires particular design. In the preferred embodiment I use a primary and a secondary radiator. The primary radiators used in my earlier broilers used V-shaped radiators. The V-shaped radiators, however, produced two dark banks on the toasted bread which occurred opposite the center of the sides of the V-shaped radiator.

To solve this problem, I changed the primary radiator to a curvilinear surface. The curvilinear primary radiator produced an excellent toast test.

The A.G.A requires a bake test where two cakes must have a uniform color and surface texture. My broiler did (without the secondary radiator) not produce a satisfactory cake test. The cakes contained pockets of steam inside the cakes and the surface of the cakes was not smooth, and the edges of the cakes were cracked. The reason why the cakes were unsatisfactory was because the cakes were too hot.

In order to solve this problem, I had the secondary radiator blasted with grit and sprayed with a thick coating of aluminum. The purpose of using an aluminum coating was to reduce the emissivity to about 0.05 to 0.10. I also found that the reflectivity of an aluminum plate is about 90%. Thus, this aluminum plate would reflect this quantity of radiation emitted by the top surface of the secondary radiator.

I found that the cake test with these changes produced perfect cakes. I also found that the toast test was very satisfactory and the time required was 3.15 minutes. The prior art broilers required 6.3 minutes.

My stoichiometric burner has an aperture array which will produce a uniform radiation field. The aperture array is shown in FIGS. 2 and 3. I inserted thermacouples in each end of the burner and found that the average gas temperature was 1020° R. I then measured the combustion air temperature and found that the air temperature was 805° R.

Thus, the aperture spacing is given by the equation $$D_s = 2.42 \times 1020/805 \times 0.016$$

$$\text{so } D_s = 2.42 \times 1.27 \times 0.016 = 0.492$$

My oven-broiler required only 11 minutes to broil 2 spencer steaks which were one inch thick and weighed 0.65 pounds each. The steaks were nicely browned with charred points and fat frizzled. There was no gray appearance. The steaks were juicy and pink inside for medium and were also juicy when well done.

The prior art oven-broiler has no value whatsoever. Its gas consumption was 6.75 cubic feet. My stoichiometric burner consumed 4.14 cubic feet of natural gas, which represented an energy saving of 38.6%.

While the specification concludes with claims particularly pointing out and distinctly claiming the subject matter which is regarded as the invention, it is believed that the invention, its objects and features, and advantages thereof, will be better understood from the following description which merely illustrates exemplary preferred embodiments of structure which may be utilized to practice the invention taken in connection with the accompanying drawings, in which:

FIG. 1 shows an elevation of the oven-broiler; and

FIGS. 2 and 3 are top views of two different broiler burners.

FIG. 1 shows an elevation of the stoichiometric burner with a burner chamber 22 and the gaseous fuel inlet 21. The free turbulent jets 5 entrain the combustion air, and coalesce in the stoichiometric demarcation plane 7. A primary radiator 11 having a curvilinear form and a nose which prevents the radiation from excessively heating the top surface of the stoichiometric burner is disposed above the burner 22. The radiation from the nose of the primary radiator 11 is also very effective in producing uniform radiation field in addition to the radiation from the curvilinear surface. A secondary radiator 12 is disposed above primary radiator 11 and extends farther to both sides. Radiator 12 is grit blasted and then sprayed with molten aluminum as mentioned previously. The flat plate 14 reflects the radiation which is emitted by the secondary radiator 12.

After ignition, the combustion products 9 impinge on the primary radiator 11 first and heat it to a red heat. The radiation from this primary radiator heats the burner chamber 22 and the gaseous fuel flowing in the chamber 22. The combustion products 9 flowing laterally have a much lower temperature when they reach the secondary radiator 12. The secondary radiator 12 with its much larger area produces a quantity of thermal radiation produced by the primary radiator 11 will provide a uniform radiation field on the broiler pan 3. The vertical dimensions of the assembly are disturbed in that broiler pan 3 is of course spaced farther down underneath the burner 22.

FIG. 2 shows an array of apertures 23 which array produces a uniform temperature on the primary radiator 11. This is accomplished by reducing the number of apertures in the central region. The linear spacings between the apertures 23 of the burner follows the rule outlined above. The array shown in FIG. 3 follows the same pattern including the spacing, but the number of apertures is reduced. I found this to be advantageous for reducing the gas consumption.

While I have described a preferred embodiment of the invention in considerable detail for the purpose of illustration, it should be understood that the invention is not restricted to the specific details which I have shown.

It will be apparent to those skilled in this art that many other embodiments, various changes and modifications may be made without exceeding the scope of the invention as defined by the following claims, wherefore, what I claim as my invention is:

1. An oven-broiler for gas ranges comprising:
   burner means for producing a combustible stoichiometric air-gas mixture, the burner means having chamber means with a planar top surface and an inlet for connection to a source of gaseous fuel, air for combustion flowing across the top surfaces;
   aperture means positioned in the planar top surface of the chamber means for discharging free turbulent jets entraining a quantity of combustion air required for stoichiometric combustion of the gaseous fuel, said aperture means being arranged in a specific geometric array wherein the lineal distances between the apertures are identical and are approximately equal to the product of, (a) the stoichiometric air-gas ratio, (b) the aperture diameter, (c) a constant of proportionality which has a value of 2.42 and (d) the ratio of the Rankine temperatures of the gaseous fuel and the combustion air, said turbulent jets coalescing in the stoichiometric demarcation plane which is parallel to the planar top surface of the chamber means;
   a first radiator means centered over the burner means and heated by the combustion products produced by the burner means;
   a second radiator means heated by the cooled combustion products; and
   broiler pan means positioned below the burner means for supporting food to be broiled.

2. An oven-broiler in accordance with claim 1 wherein the first radiator means is a curvilinear surface with a protuberant nose which prevents the radiation emitted from a protuberant nose from heating the top surface of the stoichiometric burner.

3. An oven-broiler in accordance with claim 1 and including an aluminum plate supported by the second radiator means and for reflecting radiation emitted by the second radiator means, back to the second radiator means.

4. An oven-broiler in accordance with claim 1 and including an aluminum plate supported by the second radiator means and for reflecting radiation emitted by the second radiator means, back to the second radiator means.

5. An oven-broiler in accordance with claim 1 whereby the first radiator means is made of stainless steel.

6. An oven-broiler in accordance with claim 1 whereby the second radiator means is made of mild steel.

7. In an oven-broiler for gas ranges the combination comprising a burner means including a chamber, having burner openings for discharging free turbulent jets and an inlet for connection to a source of gaseous fuel;
   said free turbulent jets entraining the amount of air required for stoichiometric combustion of the gaseous fuel, said jets coalescing in a stoichiometric demarcation plane;
   a first radiator means disposed above the said plane and heated by combustion products developed by combustion in a zone above the said demarcation plane; and
   a second radiator means disposed above the first radiator and laterally extending beyond the first radiator, the second radiator being heated by the combustion products flowing off laterally from the first radiator, the first and second radiators together providing a downwardly directed radiation field, directing radiation away from the burner means.

8. The combination as set forth in claim 7, the first radiator means has a curvilinear surface with a protuberant nose, the first radiator being made of stainless steel, for preventing the heating of the top surface of the stoichiometric burner means by the emission of radiation from the curvilinear surface with its protuberant nose.

9. The combination as set forth in claim 7, said second radiator means being made of grit blasted steel having a sprayed on aluminum coating.

10. The combination as set forth in claim 7, said second radiator means supporting an aluminum plate in order to reflect radiation emitted by the second radiator means back to the second radiator means.

11. The combination as set forth in claim 7, wherein the first radiator means is made of stainless steel.

12. The combination as set forth in claim 7, wherein the second radiator means is made of mild steel.

13. The combination as set forth in claim 7, the burner means having apertures in a top surface for discharging free turbulent jets to apertures being arranged in a specific geometric array, the lineal distances between the apertures are similar and approximately equal to the product of the stoichiometric air-gas ratio, the diameter of the apertures, a factor of proportionality of 2.42 and the ratio of the Rankine temperatures of the gaseous fuel and of combustion air flowing across the top surface.

14. The combination as in claim 13, said first radiator as being disposed above the top surface of the chamber means, having a distance in excess of the product of said air gas ratio, the aperture diameter and a constant of proportionality which is at least 3.5.

* * * * *